United States Patent [19]

Blue

[11] 4,177,158

[45] Dec. 4, 1979

[54] METHOD FOR PRODUCING AN ATTRITION-RESISTANT ADSORBENT FOR SULFUR DIOXIDE, THE RESULTING COMPOSITION AND A PROCESS USING SAME

[75] Inventor: Emanuel M. Blue, Walnut Creek, Calif.

[73] Assignee: Chevron Research Company, San Francisco, Calif.

[21] Appl. No.: 877,434

[22] Filed: Feb. 13, 1978

[51] Int. Cl.$^2$ .......................... B01D 53/12; B01J 8/24; C09K 3/00
[52] U.S. Cl. .......................................... 252/189; 55/73; 252/190; 252/192; 252/432; 252/437; 252/443; 252/449; 252/454; 423/244
[58] Field of Search ................ 423/242, 244; 252/184, 252/185, 189, 190, 191, 192, 432, 437, 443, 449, 454; 55/73

[56] References Cited

U.S. PATENT DOCUMENTS

| | | | |
|---|---|---|---|
| 2,718,453 | 9/1955 | Beckman | 252/189 |
| 3,030,300 | 4/1962 | Flanders et al. | 208/114 |
| 3,265,611 | 8/1966 | Flanders | 208/120 |
| 3,699,037 | 10/1972 | Annesser et al. | 423/244 |
| 3,919,394 | 11/1975 | Selmeczi | 423/244 |
| 3,976,747 | 8/1976 | Shale et al. | 423/244 |
| 3,977,844 | 8/1976 | Van Slyke | 423/244 |
| 4,061,716 | 12/1977 | McCauley | 423/244 |
| 4,081,513 | 3/1978 | Moss | 423/244 |
| 4,115,249 | 9/1978 | Blanton, Jr. et al. | 423/244 |
| 4,115,518 | 9/1978 | Delmon et al. | 252/189 |

*Primary Examiner*—Richard E. Schafer
*Assistant Examiner*—T. S. Gron
*Attorney, Agent, or Firm*—D. A. Newell; R. H. Davies; D. L. Hagmann

[57] ABSTRACT

A method is disclosed for producing attrition-resistant particles of dolomite or limestone by partially glazing the exterior of the particles with a suitable glaze-forming flux, the resulting composition being useful for removing sulfur dioxide from a combustion gas using the attrition-resistant particles.

12 Claims, 1 Drawing Figure

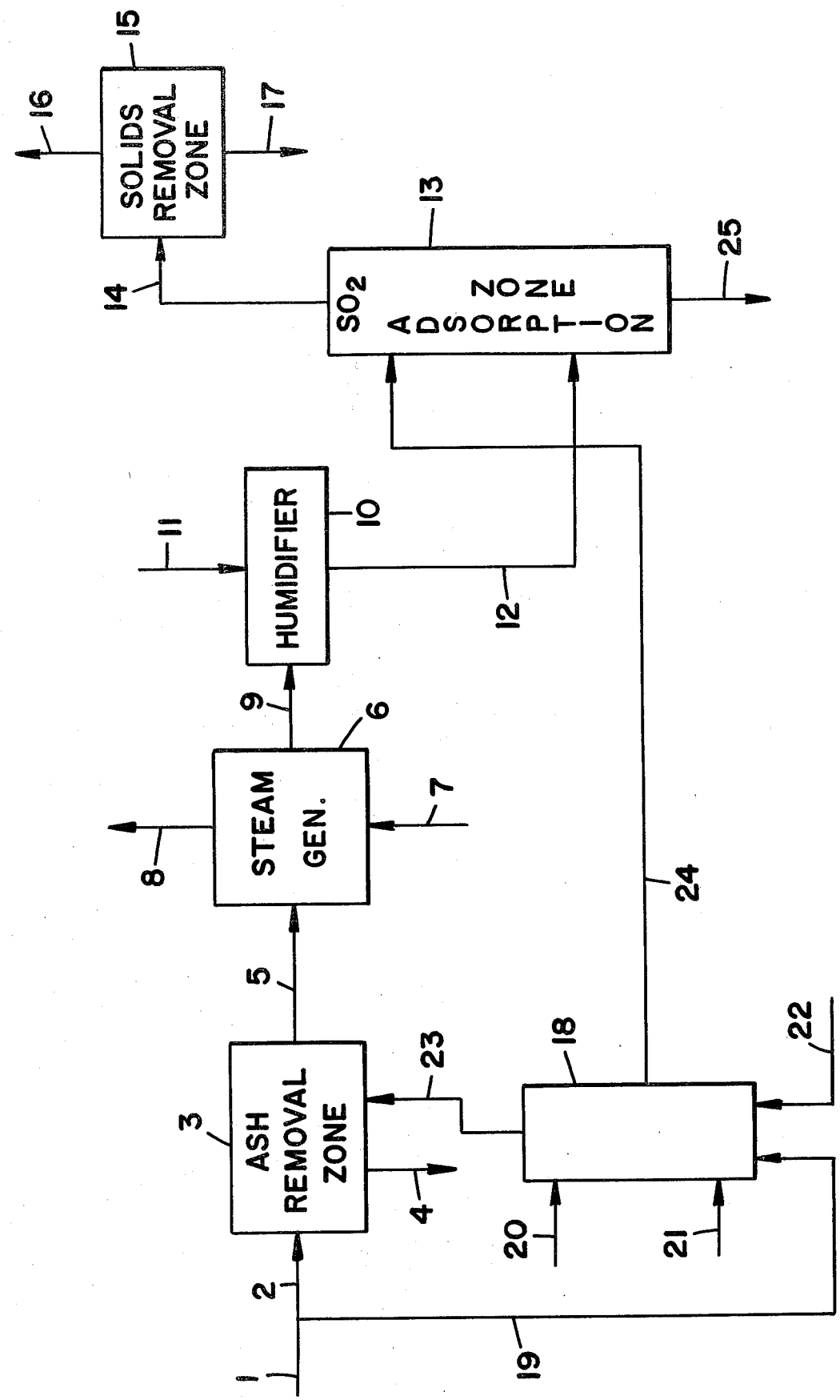

4,177,158

METHOD FOR PRODUCING AN ATTRITION-RESISTANT ADSORBENT FOR SULFUR DIOXIDE, THE RESULTING COMPOSITION AND A PROCESS USING SAME

BACKGROUND OF THE INVENTION

This invention relates to (1) a method for producing attrition-resistant particles of dolomite or limestone, (2) the resulting composition, and (3) to an adsorption process for removing sulfur dioxide from a gas using said particles as the adsorbent. More particularly, it relates (1) to a method for partially coating said particles with a glaze-forming flux by heating a mixture of said particles and flux at a suitable temperature; (2) to the resulting composition, and (3) to a process for removing sulfur dioxide from a combustion gas.

U.S. Pat. No. 2,718,453 teaches a process for removing sulfur dioxide from combustion gas by contacting the gas with finely divided oxides, hydroxides, and carbonates of metals of the alkaline earth series at a temperature of at least 350° F. This process is disadvantageous in that (1) the adsorbents are, in general, expensive relative to natural minerals such as dolomite, limestone and the like, and (2) these materials, as well as limestone or dolomite, are undesirably attrited under gas-solid contacting conditions normally employed in adsorbing an impurity, for example sulfur dioxide, from a gas. As a result ultra finely divided particles of the adsorbent and/or products associated with spent adsorbent are produced. To avoid atmospheric pollution and in order to meet air quality standards, particulates must be removed from the gas prior to its release to the atmosphere.

An object herein is to provide a sulfur dioxide adsorbent having improved attrition resistance, as well as an improved process using these particles to remove sulfur dioxide from a combustion gas produced by burning a sulfur-containing fuel.

A method is provided for improving the attrition resistance of a particulate solid selected from limestone and dolomite comprising the steps of:

(a) forming a mixture of the particulate solid with a finely divided solid material including at least one glaze-forming flux having a melting point lower than the particulate solid selected from phosphates, silicates and borates of alkali and alkaline earth metals and oxides of boron, the mixture containing from 0.002 to 1 part, by weight, of the finely divided solid per 100 parts of the particulate solid; and (b) glazing a fraction of the exterior of the particulate solid with the finely divided solid by maintaining the mixture at a temperature below the melting temperature of the particulate solid and high enough to melt the flux of about 0.1 to 30 minutes in a fluidized bed.

Another aspect of the invention is the attrition resistant composition resulting from the above method.

In a yet further aspect of the invention, sulfur dioxide is removed from a combustion gas by contacting said gas with a bed of particles appropriately sized for use in a fixed or fluid bed contacting zone under sulfur dioxide adsorbing conditions, said particles having improved attrition resistance resulting from the above method.

Other and more particular aspects of the invention will be evident from the description below.

EMBODIMENT

A preferred embodiment is illustrated in the simplified schematic process flow diagram of the attached drawing. This aspect of the invention provides a single pass throwaway use of the adsorbent. This is in contrast to a use where a treatment of a partially spent adsorbent is required in order to economically utilize the adsorbent, for example see U.S. Pat. No. 3,976,747 (C. C. Shale et al). The object in a single-pass operation is to minimize capital outlays as well as to reduce operational requirements, costs and the like and, thereby provide a process which is attractive for use in relatively small heat and power generating facilities, furnaces and the like, in which a sulfur-containing fuel is combusted or a sulfur dioxide-containing gas is generated, for example in smelting ore, and the like.

Referring now to the attached drawing, a combustion gas effluent resulting from burning a high sulfur-content coal in an electric power plant is introduced via lines 1 and 2 to fly ash removal zone 3 wherein solids which may be present in the gas are removed, for example by an electrostatic precipitator such as, a Cottrell unit.

De-ashed combustion gas at a temperature in the 400° to 600° F. range is withdrawn from zone 3 via line 5 and passed therein to steam generator 6 for use by indirect heat exchange means in generating wet steam using water from line 7. Steam is withdrawn via line 8 from generator 6 for use as desired. The resulting cooled combustion gas at a temperature of about 300° F. is withdrawn from generator 6 via line 8.

For effective use of limestone, dolomite and the like solid particles for adsorbing sulfur dioxide from a gas, the gas must have a high water vapor content, for example a content which is at least 80 percent of the saturation value for the solid-gas contact temperature, preferably in the 95–100% range. Even at the more desirable contact temperatures, that is, a temperature in the 125° to 280° F. range, preferably 140° to 200° F., a cooled combustion gas usually has a water vapor content below 80 percent of the saturation value and must be humidified. Cooled gas in line 9 which is at about 300° F. is introduced into humidifier 10 wherein its water vapor content is increased to about 99% of saturation, for example by admixing steam from line 11 into the gas. From humidifier 10, the humidified combustion gas at about 160° F. is withdrawn via 12 and introduced into adsorption zone 13 wherein it is contacted with a fluid bed of attrition resistant dolomite particles.

Zone 13 is a conventional fluid-bed, gas-solid contactor which is fitted with (1) a cyclone separator for removing entrained solids from the contacted gas and (2) if required to assist in maintaining a standing fluid-bed, one or more lines, not shown, for introducing an auxiliary gas, for example, a recycled portion of the treated gas effluent which is removed from zone 13 via line 14. (See "Design For Fluidization" by Joseph F. Frantz, Chemical Engineering, 3 Parts, September 17, Oct. 1 and 19, 1962, and cited references therein). Zone 13 is charged with attrition resistance of particles sized in the range of 50 to 150 microns average diameter. The contacting of the gas and dolomite particles is carried out at a liquid hourly space velocity of 3500–4000 V/V/Hr. The effluent gas stream from zone 13 is monitored for sulfur dioxide. When a permissible level, for example, a detectable amount of sulfur dioxide is noted (sulfur dioxide breakthrough), the end of run for the charge of particles has been reached. The effluent gas from humidifer 10 in line 12 is then diverted to a parallel adsorption zone (not shown) containing a fresh charge of adsorbent particles.

The treated gas in line 14 may contain a minor amount of very small solid particles, for example resulting from residual attrition and minor sloughing-off from the adsorbent particles of product resulting from the contacting. The gas on line 14 is passed to zone 15, a second Cottrell (electrostatic) precipitator, wherein said small particles are removed from the gas stream. Via lines 16 and 17, precipitated solids and sulfur dioxide-reduced combustion gas, respectively, are withdrawn from zone 15.

The attrition-resistant dolomite particles required for use in zone 13 are conveniently prepared in a second fluid-bed contactor, for example the off-line contactor, in a pair of contactors fitted for parallel use, not shown but suggested above, and also fitted for coating fluid-bed sized (50-150 micron size range) particles of dolomite with a glaze, for example unit 18 of the FIGURE. Via line 19 a side stream of the combustion gas from line 1 is introduced into contactor 18 in an amount sufficient to maintain a standing fluid bed of dolomite particles sized as noted above. These particles are introduced into contactor 18 via line 20. Via line 21 a powdered oil-wetted, glaze-forming composition (41% calcium phosphate, 8% magnesium oxide and 51% calcium carbonate) is introduced into contactor 18 in an amount which, by dry weight, is about 0.3 percent of the weight of the particles previously charged therein. The glaze-forming composition and the particles rapidly and intimately intermix in contactor 18. The glaze-forming composition fuses and adheres to the dolomite particles as a result of heating thereof by the hot gas from line 19 and heat produced by combusting the oil on the oil-wetted composition (see U.S. Pat. Nos. 3,265,11 and 3,030,300). The combusting is promoted by introducing air into contactor 18 via line 22. As a result of the heating, fusing and mixing, the particles are partially coated with a filagree-appearing glaze. As shown in the FIGURE, the glazed particles are withdrawn from contactor 18 via solids transfer line 24. In an alternate mode, contactor 18 is also fitted for use in the process as the parallel to contactor 13, and the glazing is carried out during the off-stream period after discharge of spent adsorbent, for example via line 25 when the adsorbent in contactor 13 is spent. The spent adsorbent is disposed of as desired.

Alkali and alkaline earth metal compounds and mixtures thereof which form a glass upon being heated are suitable for use in the present method and are contemplated herein. Preferred glaze-forming materials (flux) contain at least one material selected from the group consisting of (1) the oxides, halides, carbonates, sulfates, phosphates, silicates and borates of the alkali and alkaline earth metals, (2) the oxides of boron and (3) composites of two or more of the members of (1) and (2).

Representative glaze-forming materials include sodium chloride, sodium carbonate, potassium chloride, potassium carbonate, lithium sulfate, magnesium oxide, magnesium sulfate, magnesium carbonate, calcium oxide, calcium phosphate, calcium fluoride, calcium carbonate, calcium oleate, barium carbonate, barium sulfate, boron oxide, sodium borate and the like glaze-forming compounds. Preferred glaze-forming materials are those which are free of halogen. Good results are obtained with glaze-forming materials containing 1-25% magnesium oxide, 30-75% calcium carbonate and 25-50% calcium phosphate, the percentages being by weight.

The attrition resistant particles of the invention may be prepared by any suitable method. In a convenient preparation, for example, limestone or dolomite particles, suitably sized for use in a fixed bed or fluid bed operation, are admixed with a glazing material in powdered form, the latter having previously been wetted (about 20 cc of oil per gram of the glazing material) with a high boiling petroleum derived gas-oil. Based upon the total mixture, about 0.3 weight percent of the glazing material is desirably used. The resulting mixture is then maintained at about 1200° F. in a rotating muffle furnace for a period of about one hour and during this time a stream of air is passed through the mix. The resulting particles are coated with a discontinuous or filagree-appearing adherent glaze. Attrition and dusting off is an especial problem when the sorbent particles are employed in a fluid bed system. In this case, it may be advantageous to periodically fortify or renew the glaze by introducing a similar relative amount of oil-wetted powdered glazing material. The hot flue gas and residual oxygen gas therein and/or added air as required to combust the oil, provide an in situ renewal of the glaze. In situ glazing in this manner is a preferred method for applying the initial glaze coating on the particles.

The glazing material should be in finely divided form, preferably in particles sized below about 1 micron in average diameter.

The wetting oil, at least in part, is believed to burn while still associated with the glaze material thereby furnishing heat which is useful in forming the desired glassy glaze. The oil should therefore boil above 500° F. and preferably have a pour point below 0° F.

The amount of oil desirably applied to the powdered glaze varies depending upon the nature of the glazing material and, in general, based upon the weight of this material, is in the range of from about 0.1 to 1 weight percent. The oil-wetted glaze material should be a relatively free flowing powder.

The amount of glaze-forming material desirably contained by the attrition resistant adsorbent herein varies, depending upon the sizing of the particles and per 100 parts by weight of material is in the range of from about 0.002 to 1 part. Preferably the amount is sufficient to cover a fraction of the exterior of the particles which is in the range of from about 5 to 95 and, more preferably about 25 to 75 percent. Good results are experienced when about one-third of the exterior of the particles is glazed.

The attrition-resistant adsorbents produced by the method herein are suitable, in general, for use as adsorbents for sulfur dioxide in removing sulfur dioxide impurity from gas mixtures and such use is contemplated herein. Preferably, the adsorbent particles in a fixed or fluid bed are contacted with a combustion gas which contains sulfur dioxide impurity and which is substantially saturated with water vapor, the contacting being at a temperature in the range above about 125° F. and below about 1500° F., more preferably 150° to 280° F. and at a space velocity normally employed for such contacting, that is, in the range of from about 500 to 5000, preferably 1000 to 4000 V/V/Hr.

While particular embodiments of the invention have been set forth, it will be understood, of course, that the invention is not limited thereto, as many modifications can be made; it is therefore contemplated to cover by the appended claims any such modifications as are included within the true spirit of the invention.

What is claimed is:

1. A method for improving the attrition resistance of a particulate solid selected from limestone and dolomite comprising the steps of:
   (a) forming a mixture of said particulate solid with a finely divided solid material including at least one glaze-forming flux having a melting point lower than said particulate solid selected from phosphates, silicates and borates of alkali and alkaline earth metals and oxides of boron, said mixture containing from 0.002 to 1 part, by weight, of said finely divided solid per 100 parts of said particulate solid; and
   (b) glazing a fraction of the exterior of said particulate solid with said finely divided solid maintaining said mixture at a temperature below the melting temperature of said particulate solid and high enough to melt said flux for about 0.1 to 30 minutes in a fluidized bed.

2. A method according to claim 1 wherein said mixture includes from 0.002 to 0.3 parts of said finely divided solid per 100 parts of said particulate solid.

3. A method as in claim 1 wherein by weight said finely divided solid contains (1) an amount of magnesium oxide in the range of from about 1 to 25 percent, (2) an amount of calcium carbonate in the range of from about 30 to 75 percent and (3) an amount of calcium phosphate in the range of from about 25 to 50 percent.

4. A method as in claim 1 wherein said finely divided solid contains by weight (1) about 41 percent of calcium phosphate, (2) about 8 percent of magnesium oxide and (3) about 51 percent of calcium carbonate.

5. A method as in claim 1 wherein said glazing is a filagree-appearing glaze covering a fraction of said exterior in the range of from 5 to 95 percent.

6. A method as in claim 5 wherein said fraction is in the range of from about 25 to 75 percent.

7. A method as in claim 5 wherein said fraction is about one-third.

8. The composition resulting from the method of claim 1 wherein said finely divided solid by weight contains (1) magnesium oxide in an amount in the range of from about 1 to 25 percent, (2) calcium carbonate in an amount in the range of from about 30 to 75 percent, and (3) calcium phosphate in the range of from about 25 to 50 percent.

9. The composition as in claim 8 wherein said finely divided solid contains by weight (1) about 41 percent of calcium phosphate, (2) about 8 percent of magnesium oxide and (3) about 51 percent of calcium carbonate.

10. A composition as in claim 8 wherein said glazing is a filagree-appearing glaze covering a fraction of said exterior in the range of from about 5 to 95 percent.

11. A composition as in claim 10 wherein said fraction is in the range of from about 25 to 75 percent.

12. A composition as in claim 10 wherein said fraction is about one-third.